United States Patent [19]

Lehman

[11] Patent Number: 5,732,402

[45] Date of Patent: Mar. 24, 1998

[54] SYSTEM AND METHOD FOR DATA SPACE MANAGEMENT USING BUDDY SYSTEM SPACE ALLOCATION

[75] Inventor: Tobin Jon Lehman, Los Gatos, Calif.

[73] Assignee: International Business Machines Corporation, Armonk, N.Y.

[21] Appl. No.: 387,052

[22] Filed: Feb. 10, 1995

[51] Int. Cl.⁶ .................................................. G06F 17/30
[52] U.S. Cl. ........................ 707/205; 707/200; 707/100
[58] Field of Search ................................ 395/600, 621, 395/611, 616

[56] References Cited

U.S. PATENT DOCUMENTS 5,490,274  2/1996  Zbikowski et al. ................. 395/700

OTHER PUBLICATIONS

A. Biliris, "An Efficient Database Storage Structure for Large Dynamic Objects", Eighth International Conference on Data Engineering, 2–3 Feb. 1992, Tempe, Arizona, pp. 301–308.

Huang et al., "Efficient Storage Management for Large Dynamic Objects", Proceedings of the Twentieth EUROMICRO Conference. System Architecture and Integration, 5–8 Sep. 1994, Liverpool, UK, pp. 37–44.

P.D.L. Koch, "Disk File Allocation Based on the Buddy System," from ACM Transactions on Computer Systems, vol. 5 No. 4 (Nov. 1987) at 352–370.

T. Lehman, B. Lindsay, "The Starburst Long Field Manager" from International Conference on Very Large Databases (1989).

Primary Examiner—Paul R. Lintz
Attorney, Agent, or Firm—Baker, Maxham, Jester & Meador

[57] ABSTRACT

A relational data base management system that stores and retrieves large data objects (LOBs) from data base storage includes a data manager that maintains LOB data space allocation according to the buddy system with two types of allocation pages, called regular buddy space (RBS) pages and super buddy space (SBS) pages. The RBS pages control buddy spaces comprising equal-size areas of the LOB data space in which LOB buddy segments are stored. The SBS pages control the RBS pages. The RBS pages include a pointer array that contains the forward-most location of where searching for a free storage space should begin and a counter array that indicates the number of free buddy segments in a buddy space for a particular buddy segment size. The SBS pages include analogous pointer and counter arrays that refer to the RBS pages and indicate the location and extent of free storage space, and also include a divided-space array and an SBS page directory.

4 Claims, 12 Drawing Sheets

SYSTEM AND METHOD FOR DATA SPACE MANAGEMENT USING BUDDY SYSTEM SPACE ALLOCATION

BACKGROUND OF THE INVENTION

1. Field of the Invention

This invention relates generally to space management systems and, more particularly, to allocation of data space for large objects in relational database systems.

2. Description of the Related Art

Advances in computers and data storage devices have provided users with increasingly faster data access times and with the ability to manipulate information comprising increasingly large blocks of data values stored in data spaces of computer memory and data storage devices. Such advances place requirements on space management systems to manage increasingly larger data spaces and to allocate large amounts of available data space to data values more quickly.

One such space management technique is known as the binary buddy system. The buddy system generally is known to be a high performance space management system that can operate on a wide range of block sizes, allocating and freeing the blocks with great efficiency. The binary buddy system manages blocks, or memory segments, whose sizes correspond to powers of two. In the simplest description of the binary buddy system, the data space in which data values are contained includes a buddy space that has a size that is a power of two units large. For example, a buddy space might comprise four megabytes (written 4 MB) of storage locations, which actually corresponds to 4×1,024,000 bytes or $2^{12}$ bytes. The entire buddy space can be divided into two segments (known as buddy segments). In the example, the two segments would each be 2 MB in size. Each of these buddy segments can be further subdivided into two smaller buddy segments—and so on until a minimal buddy segment size is reached. That is, the buddy space can be comprised of multiple buddy segments, all of different sizes, all being powers of two. The minimal segment size that the system can allocate might be, for example, one kilobyte (1 KB) worth of data storage locations.

When a data value of a certain size is to be stored, a space allocator of the buddy system must allocate a buddy segment for the data value. In attempting to allocate a (power-of-2-size) buddy segment, the space allocator either finds a segment of the correct size, or finds a larger segment (starting with up to 4 MB in the example) and splits it down (subdivides) repeatedly to the desired size. Thus, buddy segments might be allocated in storage blocks of size 1 KB, 2 KB, 4 KB, 8 KB, . . . , 512 KB, 1 MB, and so on up to the buddy space size limit of the computer system in which the data base is installed. When freeing a buddy segment from storing a data value, the space allocator automatically joins that segment with its buddy (if the buddy is free). Similarly, that resulting larger segment is joined with its buddy if the buddy is free—and so on until the maximum size segment again is reached.

Typically, implementations of the buddy system space management technique have two main components: the space allocation information and the data space itself. The space allocation information includes the status of the buddy spaces with respect to subdivisions into buddy segments and the assignment of the buddy segments to data values. The computer system uses the allocation information to manage the allocation and freeing of storage locations for data values. When used to manage a computer memory space, the space allocation information is represented as a large main-memory data structure. When used to manage (large amounts of) disk storage, the space allocation information is represented as disk-resident data structures. Currently, the size of a buddy segment is bounded by the amount of allocation information that can be represented by a single disk page, i.e., if the largest buddy segment that a single disk page can represent is one megabyte in size, then no larger size buddy segment can easily be represented. Although one could represent larger sizes by simply stringing a set of maximum size segments together, this solution does not scale and actually introduces a significant amount of complexity in terms of tracking segment sizes and boundaries. For example, allocating space requires linear searches of the allocation information for free buddy segments, and therefore stringing buddy segments together causes the search to degrade in terms of speed as more spaces are added. For very large data values, the scheme is not useful, because too many disk access operations are required.

From the discussion above, it should be apparent that there is a need for a data space management system that permits reduced disk access operations in allocating, storing, and retrieving data values that are stored according to a buddy segment system of allocation. The present invention satisfies this need.

SUMMARY OF THE INVENTION

In accordance with the invention, a data storage device area containing data is referred to as the "Buddy Space" and data storage pages containing allocation information are referred to as "Regular Buddy Space" allocation pages (RBS pages). An RBS allocation page contains a data structure representing the allocation information of the Buddy space and is used to manage the Buddy Space data device storage locations. In addition to the RBS pages, there are additional "Super Buddy Space" allocation pages (SBS pages) that manage RBS pages in a similar fashion to the way RBS pages manage the Buddy Space. By managing a set of RBS pages, an SBS page also manages the space controlled by its RBS pages, so the SBS page has the ability to manage much larger buddy segment sizes, as well has having the ability to track much more space from a single allocation page. This permits an allocation such as the following to be used:

| | |
|---|---|
| Space managed by an RBS page: | 8 megabytes |
| Largest segment managed by an RBS page: | 8 megabytes |
| Space managed by an SBS page: | 64 gigabytes |
| Largest segment managed by an SBS page: | 64 gigabytes |

In a present embodiment, for example, segments up to 64 megabytes are used, but the design of the invention permits the maximum size to grow to 64 gigabytes without difficulty in the space management task.

In one aspect of the invention, a relational data base management system that stores and retrieves large data objects (LOBs) from data base storage includes a data manager that maintains LOB data space allocation with two types of allocation pages, wherein the first type of allocation pages, called regular buddy space (RBS) pages, control distinct buddy spaces comprising equal-size areas of the LOB data space in which LOB buddy segments are stored, and wherein the second type of allocation pages, called super buddy space (SBS) pages, control the RBS pages. Each one of the RBS pages includes a pointer array that contains the forward-most location of where searching for a free storage space should begin and a count array that indicates the number of free buddy segments in a buddy space for a particular buddy segment size. The SBS pages include analogous pointer and counter arrays that refer to the RBS pages and indicate the location and extent of free RBS pages. At least one of the SBS pages also includes a divided-space array and an SBS page directory that indicate SBS page subdivisions. An SBS page controls a 64-gigabyte sized data space, thus, only a single disk access is needed to search the 64-gigabyte space and allocate any SBS-size segment. In this way, only a single disk access operation is needed for allocation of up to 64 GB, thereby reducing the number of access operations necessary to store LOBs. Moreover, the SBS page structure can be integrated with an existing buddy space allocation structure without restructuring the data space.

In another aspect of the invention, the divided-space array of the SBS pages contains one bit for every SBS unit of space. When a bit is turned on for an SBS space unit, the bit indicates that the corresponding space controlled by the SBS page has been subdivided into smaller RBS-size pages. If a bit is not turned on, then the corresponding SBS page is a full-sized SBS page and its condition is indicated by the SBS allocation bits as being either allocated or free.

In yet another aspect of the invention, the SBS page directory comprises an array stored in the first SBS page, called the SBS zero page, that contains a flag for a predetermined number of the largest buddy segment sizes for each SBS page. If there is at least one buddy segment of a particular size available in an SBS page, then the corresponding flag is set in the SBS directory. That flag otherwise is set to zero.

Other features and advantages of the present invention should be apparent from the following description of the preferred embodiment, which illustrates, by way of example, the principles of the invention.

DESCRIPTION OF THE PREFERRED EMBODIMENT

Figure 1:
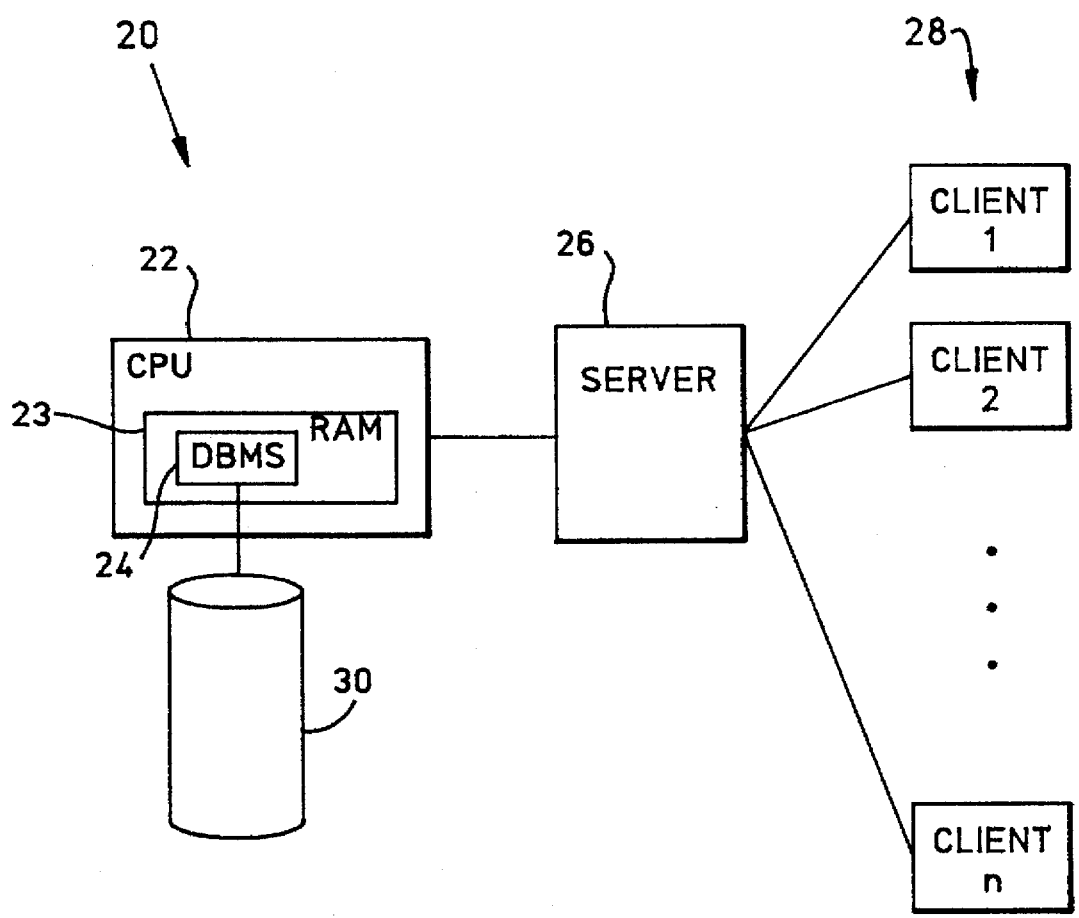
FIG. 1 is a block diagram of a computer system having a relational data base management system constructed in accordance with the present invention.

FIG. 1 illustrates a computer processing network system 20 constructed in accordance with the present invention. The system includes a central processor unit (CPU) 22 having random access memory (RAM) 23 in which is resident a relational data base management system 24 (referred to as the DBMS). The CPU 22 is connected to a file server 26, to which many clients 28 can be connected. In FIG. 1, only three clients are shown, for simplicity of illustration. A storage subsystem 30 that is connected to the CPU 22 provides storage locations where data values comprising a relational data base are kept. The storage locations are grouped into equal-sized areas called storage pages, or blocks. The DBMS 24 receives data base requests from the clients 28 and performs data access operations to store and retrieve referenced data values from the storage subsystem 30. The DBMS supports a large data object (LOB) data type consisting of data values typically greater than 32 kilobytes (KB) in size. In accordance with the present invention, the DBMS 24 maintains data structures called allocation pages that keep track of data storage availability in the storage subsystem according to a two-tiered system in which one tier of pages, called "regular buddy space" (RBS) pages, are indexed to the pages of the storage subsystem and another tier of pages, called "super buddy space" (SBS) pages, are indexed to the RBS pages. That is, the RBS pages indicate pages of the storage subsystem as being either free or allocated and the SBS pages indicate RBS pages as being either free or allocated. In the illustrated embodiment, for example, an RBS page is four kilobytes (4×1024 bytes, written as 4 KB) in size and controls eight megabytes (8×1,024,000 bytes, written as 8 MB) of data.

The CPU 22 can comprise, for example, a large mainframe machine such as the International Business Machines Corporation (IBM Corporation) product called "System/390" or can comprise a workstation such as the IBM Corporation product called "AS/400" or can comprise an "IBM Personal Computer" processor or compatible machine. Typically, the file server 26 is a processor that is at least as powerful computationally as any one of the clients 28. The file server can comprise, for example, a workstation and each of the clients can comprise an "IBM Personal Computer" machine. The storage subsystem 30 can comprise any of a number of conventional direct access storage devices (DASDs) known to those skilled in the art, such as one or more magnetic disk drive systems.

A relational data base system such as illustrated in FIG. 1 is a type of data base that organizes information for more efficient user manipulation and will be familiar to those skilled in the art. A relational data base organizes data values into tables with user-defined interrelationships between the tables. A relational data base management system permits users to construct statements that the system will recognize and use to extract, insert, and combine data values from the tables. The selected data values can be assigned to new strings, which comprise table entries, or can replace existing strings. For example, users can use a substring operator in an assignment statement to extract a portion of a character string or video image and assign the extracted portion to a new string (or to replace the existing string) for further manipulation. Users can use a concatenate operator to join two separate strings into a single string, perhaps combining video images or phonetic sounds. Further examples of string operators will occur readily to those skilled in the art.

In addition to being organized into tables of related data values, the data values of the relational data base in the illustrated DBMS 24 are stored in accordance with storage units defined by a data device hardware configuration. Typically, the relational data base stores a single data value (or table entry) entirely within a single storage unit called a page, which contains one kilobyte (1024) of storage locations. Other page sizes can be used. For example, a page usually includes between 512 bytes and 32768 bytes (32× 1024 bytes, referred to as 32 kilobytes and abbreviated 32 KB). Storing a data value within a single page limits the maximum size of a single data value to the size of the page itself. To provide less restrictive limits on the data values stored, the relational data base management system 24 includes a specially-defined data type called a long field or large object, generally referred to as a LOB. For example, the data base language known as "SQL" permits a user to define LOB data types referred to as BLOB, CLOB, and DBCLOB.

The LOB data values are stored in a file located within one or more disk drives of the storage subsystem 30 comprising a designated area called the LOB data space. A LOB can have a size so large (several gigabytes) that LOBs are stored in subdivided parts called LOB segments according to the binary buddy system. The disconnected LOB segments are kept in the LOB data space in disk storage. A LOB storage/retrieval mechanism of the data manager maintains pointers from one LOB segment to another, thereby keeping all the segments of a single LOB data value together. To store or retrieve all the LOB segments of a LOB from the LOB data space on disk, a series of many disk access operations may be necessary.

Management of the LOB data space, including allocation of space and storage/retrieval of data, is controlled by allocation pages that are kept in a LOB space allocation file. Each allocation page in the LOB space allocation file indicates free space and occupied, or allocated, space in a fixed amount of the LOB data space. The fixed amount of space controlled by an allocation page is generally referred to as a buddy space and can contain many buddy segments. The pages in the space allocation file include a means of indicating free blocks of storage locations within the buddy space and in that way the allocation file controls the storage of data in the buddy space. Control of free storage locations is carried out by setting flags in the allocation pages that indicate whether a space is currently occupied or is free to be used.

Figure 2:
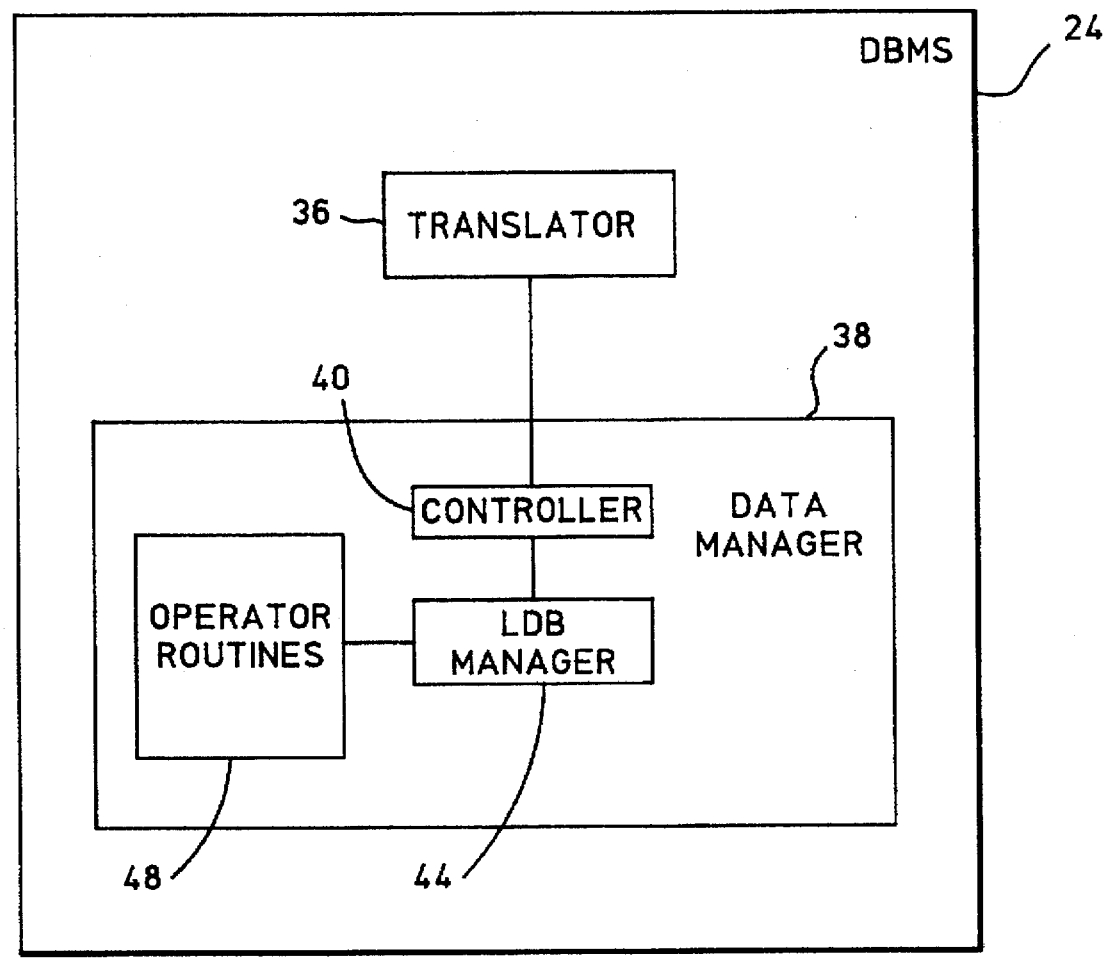
FIG. 2 is a block diagram of the relational data base management system illustrated in FIG. 1.

FIG. 2 illustrates the functional blocks of the DBMS 24. FIG. 2 shows that the DBMS includes two primary functional blocks, a translator 36 and a data manager 38. The translator receives data base requests from the clients 28 (FIG. 1) in the form of assignment statements according to a data base language format (such as the language known as "SQL") and converts them into data structure representations and expressions that are recognizable by the data manager. The translator 36 converts the assignment statements from the clients 28 according to conventional translation schemes, depending on the relational data base management system being used. The assignment statements as formulated by the clients, for example, might be in an SQL language format specified by a data base management system software product called "DB2" available from IBM Corporation. The translation schemes used by systems such as the "DB2" data base management system and the like will be understood by those skilled in the art without further explanation.

The data manager 38 carries out the translated assignment statement operation that was specified by the user. The data manager performs the operations with a controller 40, a LOB manager 44 that handles LOB processing, and a set of operator routines 48 typically comprising string operators and the like. Usually, the assignment statement operations will involve the storage and retrieval of data values from the data base storage subsystem 30 (FIG. 1). In that circumstance, it will be necessary for the data manager to allocate sufficient storage blocks in the data base storage subsystem or, if a block is no longer needed, it will be necessary for the data manager to free storage blocks so they can be used for subsequent storage operations. It is typically the function of the LOB manager to attend to allocation of storage and the actual requests to the CPU for input/output processing.

Figure 3:
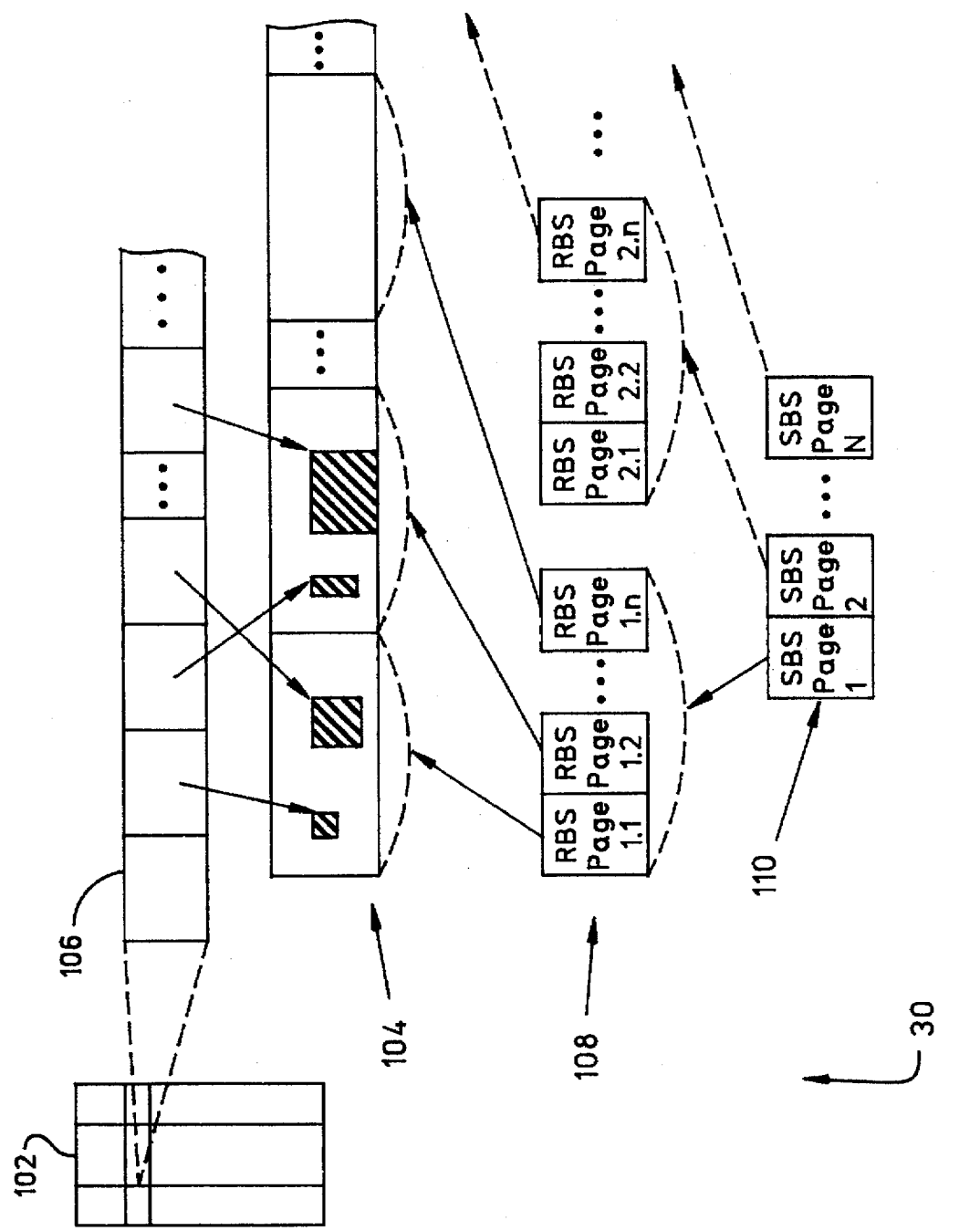
FIG. 3 is a block diagram representation of the data structures maintained by the data manager illustrated in FIG. 2 in allocating space for LOBs.

FIG. 3 illustrates the data base space in the storage subsystem 30 (FIG. 1). In the relational data base system, the data space includes a plurality of relations defined by data tables, of which one data table 102 is shown in FIG. 3 for purposes of illustration. As known to those skilled in the art, the data table relations are defined by columns of the data table. FIG. 3 illustrates that one entry in a column of the data table can refer to a LOB data structure 104 stored in the data base space. FIG. 3 shows that a data structure called a LOB descriptor 106 is associated with the LOB and includes various control fields described further below. FIG. 3 shows that the various control fields of the LOB descriptor point to the LOB.

FIG. 3 also illustrates the LOB allocation file RBS pages 108, which point to the LOB spaces, and the LOB allocation file SBS pages 110, which point to the RBS pages above them and control the RBS pages. The RBS allocation pages 108 and SBS allocation pages 110 are illustrated in a tiered arrangement in FIG. 3 to best reflect their functional relationships, however, in the preferred embodiment, the RBS pages and SBS pages are arranged serially in the data base space, as described further below. It also should be understood that, if desired, the RBS pages and SBS pages may be kept separately from the LOB data space. The LOB descriptor 106 preferably is of the minimum size necessary to perform its function of defining a LOB in the data base. In the preferred embodiment, the LOB descriptor comprises a single value that defines a large data object that may be stored in the data space in non-contiguous blocks of memory.

Figure 4:
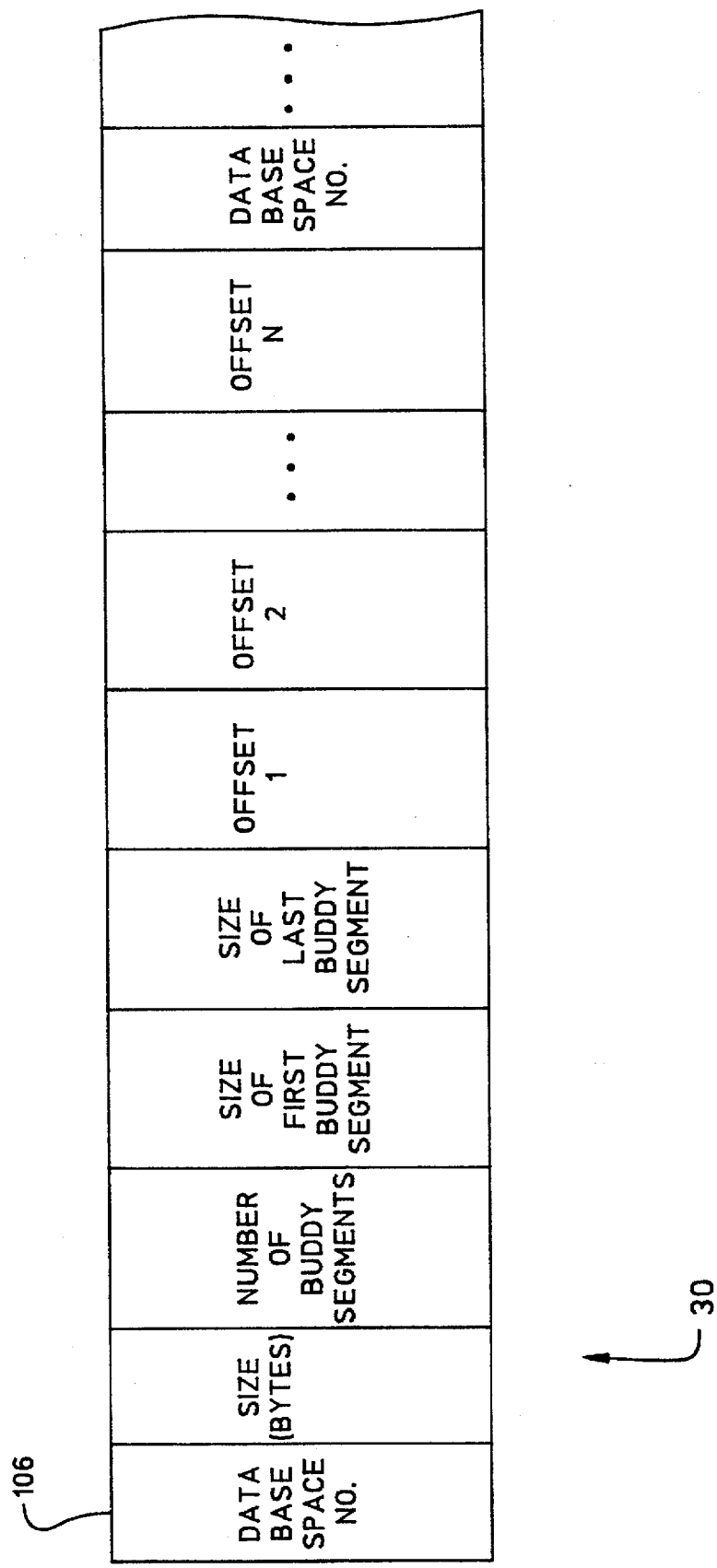
FIG. 4 is a representation of the LOB descriptor data structure illustrated in FIG. 3.

FIG. 4 shows details of the LOB descriptor 106 data structure in the preferred embodiment. The first field of the LOB descriptor is a data space number that identifies a data space of the storage subsystem in which the LOB is stored. It should be understood that the data base may contain multiple data spaces for the storage of data values. The next field in the LOB descriptor provides the size of the LOB in bytes. The next field is the number of buddy segments in the LOB. The next two fields indicate the size of the first buddy segment and the size of the last buddy segment, respectively. Because the data manager allocates buddy segments in a binary fashion, the size of all the intervening buddy segments is known from specifying the first and last buddy segment sizes. The remainder of the LOB descriptor comprises a sequence of offset numbers that act as pointers to the buddy segment memory blocks of the LOB.

Figure 5:
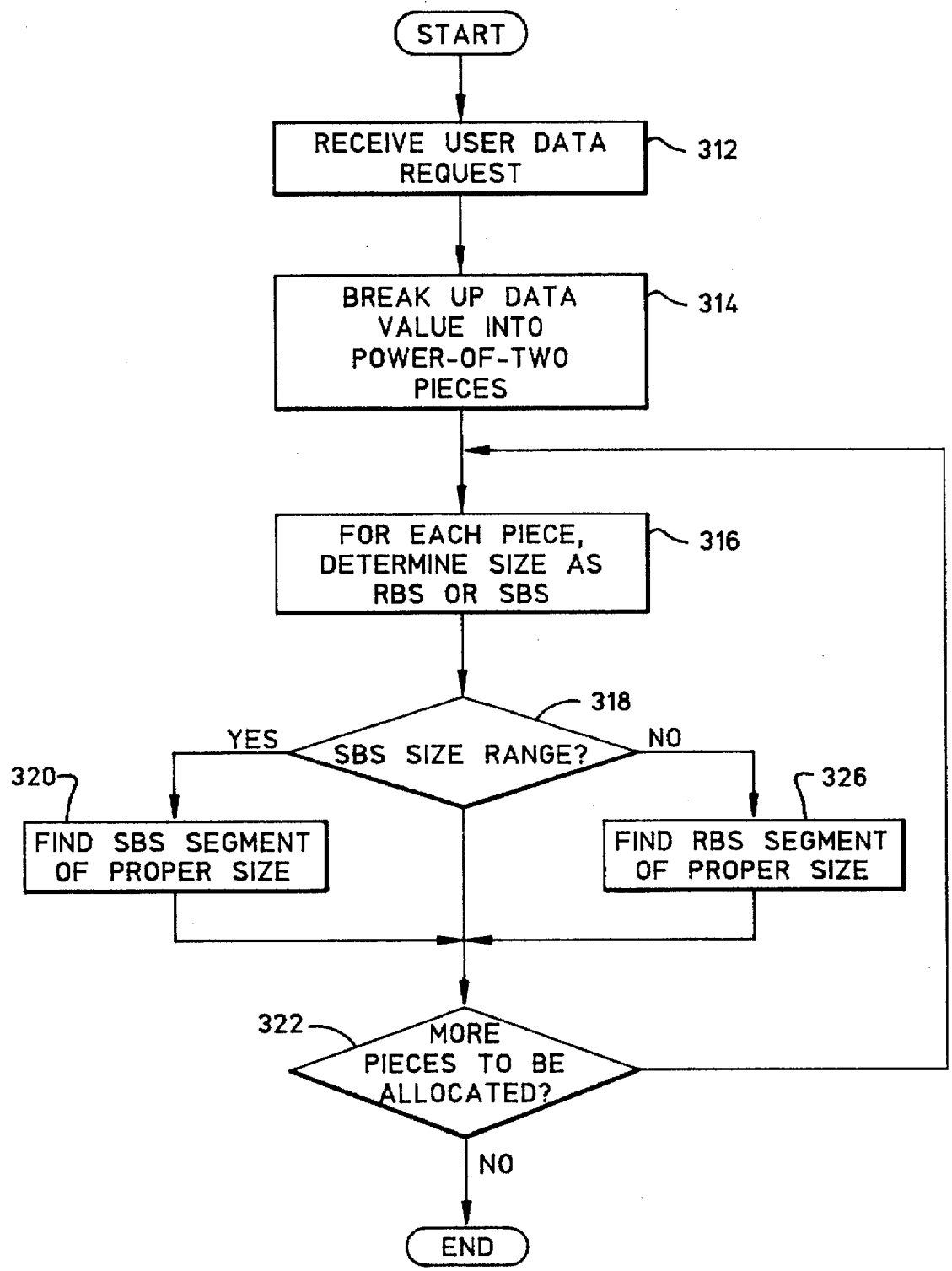
FIG. 5 is a flow diagram that illustrates the processing steps performed by the data manager illustrated in FIG. 2 in responding to user requests for data space allocation.

The data manager illustrated in FIG. 2 responds to user requests for access to LOB data values, such as for storing data values, by searching for free blocks of storage locations. The processing of the data manager in responding to such requests will be better understood with reference to the flow diagram of FIG. 5. After the data manager receives a user data request that calls for storing a LOB data value, as represented by the flow diagram box numbered 312, the data manager identifies the configuration of space needed for storage of the LOB. The data manager does this by breaking the data value up into power-of-two-sized blocks of data space and allocating data spaces accordingly. This step is represented in FIG. 5 by the flow diagram box numbered 314. For example, if the data manager receives an allocation request for a 67 MB data value, this step results in the data manager determining that it must look for data spaces of 64 MB, 2 MB, and 1 MB in size for storing the data value. Those skilled in the art will readily appreciate the steps performed by the data manager in determining the breakdown of data space sizes without further explanation.

Next, as represented by the flow diagram box numbered 316, the data manager determines a size range of data space required for each of the power-of-two pieces identified in the previous step. In the preferred embodiment, the power-of-two pieces are designated as being in an RBS range if the space needed is a space in the series 1 KB, 2 KB, 4 KB, ... .. 512 KB, 1 MB, 2 MB, 4 MB. Similarly, the power-of-two pieces are designated as being an an SBS range if the space needed is in the series 8 MB, 16 MB, 32 MB, 64 MB. In the preferred embodiment, space is not allocated in single blocks of larger size than 64 MB, but it should be apparent that SBS blocks of up to 64 GB in size can be managed in the SBS range by the data manager.

The decision box numbered 318 in FIG. 5 indicates that the data manager follows a different path of processing depending on whether the power-of-two piece to be allocated is in the RBS range or the SBS range. If the piece is in the SBS range, an affirmative outcome at the decision box 318, then the data manager finds an SBS segment (comprising one or more RBS-sized pages of space) by locating either an SBS segment of the correct size, splitting a larger SBS segment down until the data manager has a correct-sized SBS segment, or allocating a new SBS page and (if needed) splitting it to the correct size. These steps are described in greater detail below in connection with FIG. 11.

After the power-of-two piece has been allocated, the data manager determines if any further power-of-two pieces remain to be allocated, as represented by the decision box numbered 322. If more remain, an affirmative outcome, then the data manager processing returns to the flow diagram box numbered 316 to identify whether the next power-of-two piece is in the SBS range or the RBS range. If the last power-of-two piece has been allocated, a negative outcome at the decision box 322, then the data manager processing for allocating this LOB is done and processing ends.

When the data manager determines that a power-of-two piece is in the RBS range, a negative outcome at the decision box numbered 318, then at the flow diagram box numbered 326 the data manager finds an RBS segment in the 1 KB to 4 MB range by locating either an existing divided SBS segment having RBS pages such that a block of RBS pages of the correct size can be located, locating an existing SBS page that can be split into a minimal SBS segment (comprising a single RBS page of 8 MB that can be further split), or by allocating a new SBS segment and splitting it down until the data manager has a correct-sized RBS segment. These steps are described in greater detail below in connection with FIG. 12. As before, the data manager then determines at the decision box numbered 322 if any further power-of-two pieces remain to be allocated and, if more remain, returns to the flow diagram box numbered 316 to identify whether the next power-of-two piece is in the SBS range or the RBS range. If the last power-of-two piece has been allocated, then the data manager processing for allocating this LOB is done and processing ends.

Figure 6:
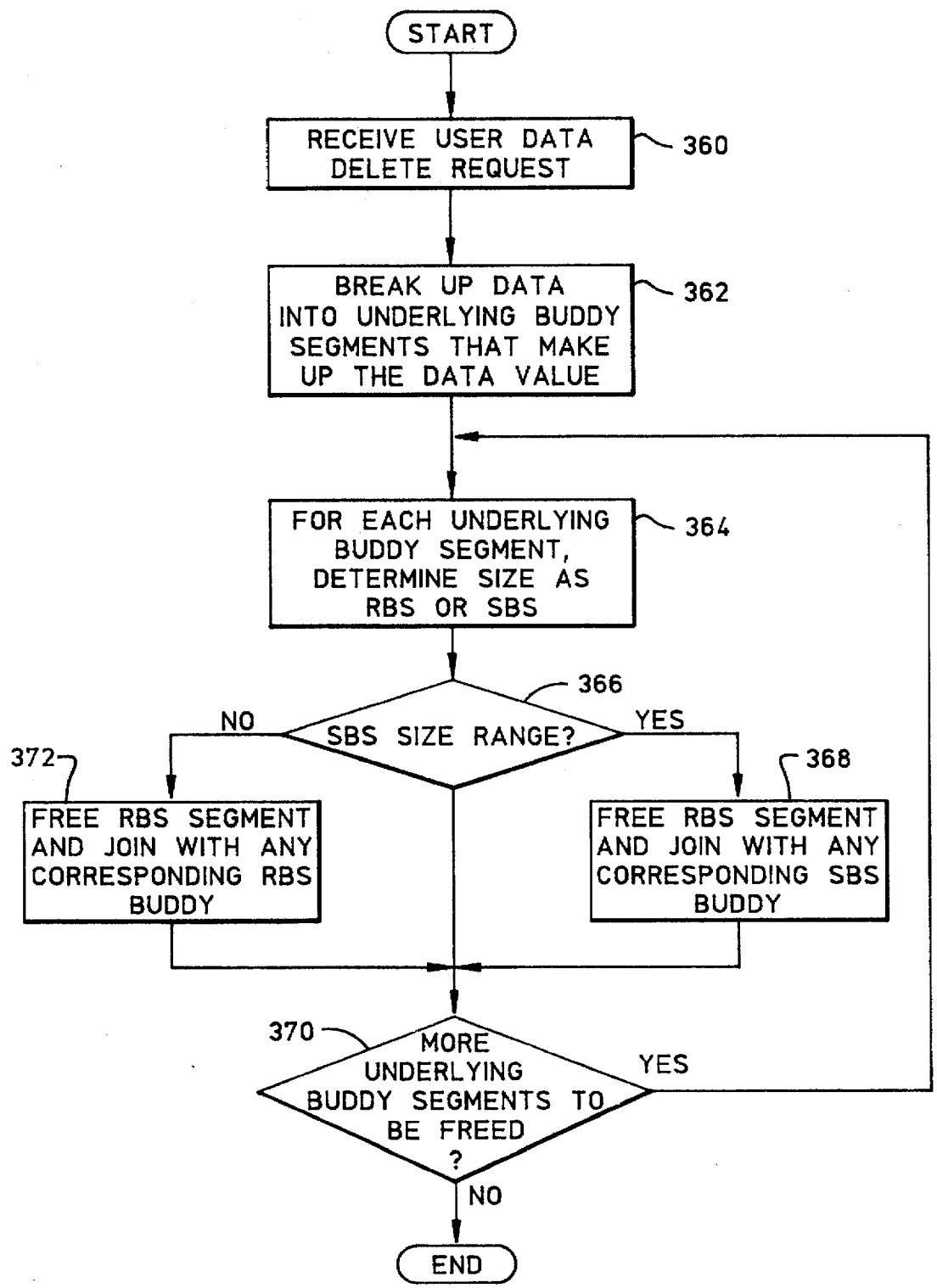
FIG. 6 is a flow diagram that illustrates the processing steps performed by the data manager illustrated in FIG. 2 in responding to user requests for freeing data space.

FIG. 6 illustrates the processing followed by the data manager for freeing a block of data space, such as in response to a user request to delete a LOB. After the data manager receives a user request that calls for freeing a LOB data value, as represented by the FIG. 6 flow diagram box numbered 360, the data manager breaks up the LOB into the underlying buddy segments that make up the LOB. The step of breaking up the LOB is represented by the flow diagram box numbered 362. For example, if a LOB of size 67 MB is to be deleted, then the data manager identifies the underlying buddy segments to have respective sizes of 64 MB, 2 MB, and 1 MB. At the flow diagram box numbered 364, the data manager identifies, for each underlying buddy segment, whether the segment is in the RBS range or the SBS range, as defined above in connection with the allocation processing.

Next, as represented by the decision box numbered 366, the data manager follows a different path of processing depending on whether the underlying buddy segment to be freed is in the RBS range or the SBS range, as defined above. If the underlying segment is in the SBS range, an affirmative outcome at the decision box 366, then at the flow diagram box numbered 368 the data manager examines the corresponding allocation page for the SBS segment and determines if the buddy of the freed segment also is free. If the buddy is free, then the data manager changes the allocation page to join up the two freed segments into one larger free segment. The data manager continues this process of joining free blocks until it can free the maximum SBS-size block (in the preferred embodiment, a maximum 64 GB block can be accommodated). At that point, an entire SBS page has been freed and the joining up steps for that underlying segment are completed. These steps are described in greater detail below in connection with FIG. 13.

At the FIG. 6 decision box numbered 370, the data manager determines if more underlying buddy segments remain to be freed. If more remain, an affirmative outcome, then data manager processing returns to the decision box numbered 364 to identify the size range of the next underlying buddy segment. If the last underlying segment was freed, so that no more underlying buddy segments remain (a negative outcome at box 370), then the data manager steps for freeing this LOB are completed and such processing ends.

Back at the decision box numbered 366, if the data manager determines that the next underlying buddy segment is in the RBS range, a negative outcome at the decision box, then at the flow diagram box numbered 372 the data manager examines the corresponding RBS allocation page for the RBS segment and determines if the buddy of the freed segment also is free. If the buddy is free, then the data manager changes the allocation page to join up the two freed RBS segments into one larger free segment. The data manager continues this process of joining free blocks until it can free two 4-MB buddy segments of the same RBS page. At that point, an entire SBS segment has been freed and the free RBS pages are "turned into" a free SBS segment. That is, the information in the corresponding SBS allocation page is changed to reflect the free status of the segment. These steps are described in greater detail below in connection with FIG. 14. Once again, at the decision box numbered 370 the data manager then determines if more underlying buddy segments remain to be freed and proceeds accordingly.

Figure 7:
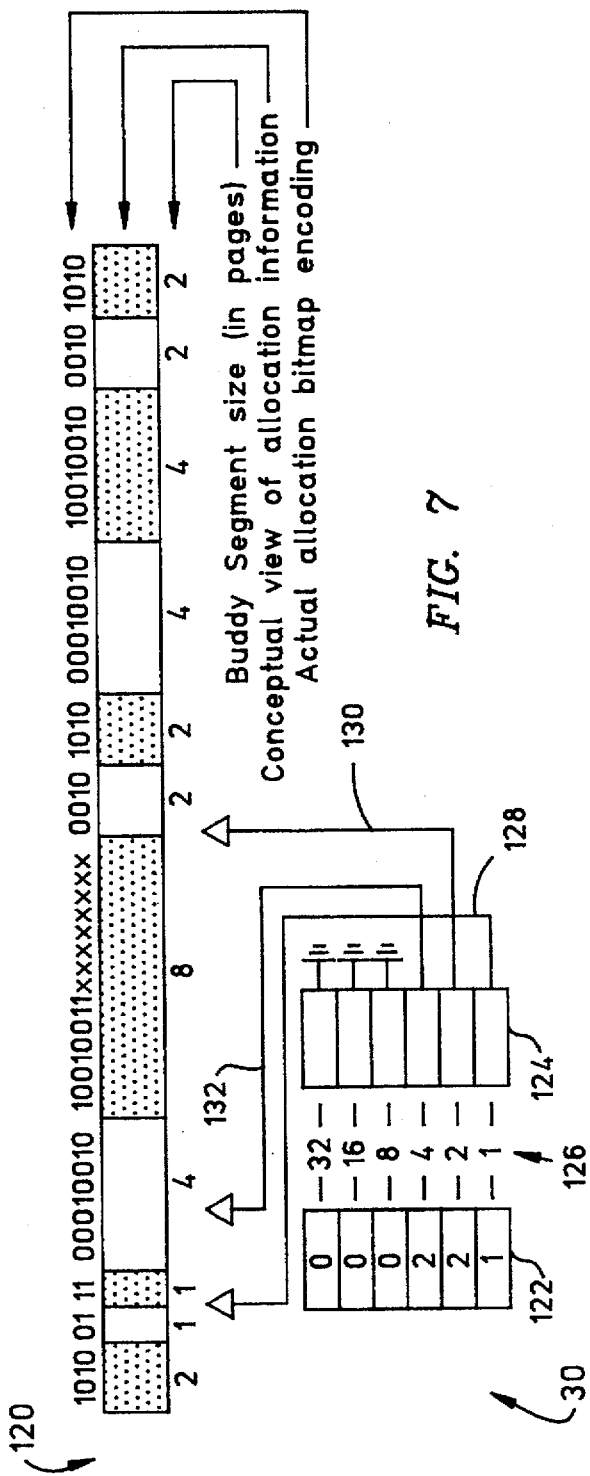
FIG. 7 is a representation of the allocation page data structure illustrated in FIG. 3.

As noted above, a two-tiered system of allocation pages is used to control the allocation of storage locations in the LOB data space in which the RBS pages control the buddy segment pages of the data space and the SBS pages control the RBS pages. Each allocation page has three parts, comprising an allocation bit map, a count array, and a pointer array. These data structures are illustrated in FIG. 7. The values of the allocation bitmap 120 are shown in FIG. 7 with a corresponding diagrammatic representation, which indicates allocated blocks of storage locations with dark bands and indicates available blocks with light bands. The bitmap is ordered according to storage location address. For an RBS page, the allocated blocks of storage and free blocks of storage correspond to allocated and free blocks of buddy segments, respectively. For an SBS page, the allocated blocks of storage and free blocks correspond to allocated and free RBS pages. For example, in the preferred embodiment, each RBS page controls storage equal to 8192 storage pages (8192=8×1024, also referred to as 8K), each of which contains 1024 bytes (1 KB) of storage locations.

Thus, each RBS page controls a block of storage locations equal to (8K)×(1 KB) of storage, or 8 MB of storage. It should be apparent that a different data page size will provide a different block size over which an RBS page has control. In an analogous manner, each SBS page controls 8192 RBS pages (and, indirectly, their associated disk memory locations). Thus, each SBS page controls a block of storage locations equal to (8K pages) ×(8 MB of memory storage), or 64 gigabytes (64 GB) of storage. In the preferred embodiment, the system includes 64 SBS pages, so that the total storage area controlled has a size of (64)×(64 GB), or 4 terabytes. In this way, a single SBS allocation page can be used to allocate an entire 64 GB block of storage for a LOB. Moreover, the SBS allocation pages provide a means of checking the storage status (allocated or free) of an entire 64 GB block of storage pages without actually examining each of the RBS pages that control it.

Those skilled in the art will recognize that an allocation page "controls" the allocation of memory blocks in a data space by indicating which blocks are free (available) and which ones have already been allocated, in conjunction with operating processes of the data manager. If an allocation page indicates that a block is allocated, then the data manager will not attempt to use that block of memory to store a data value when a user makes an access request, such as with an assignment statement. If an allocation page indicates that a block is free, then the data manager will go ahead and try to use that block when it needs to find space to store a data value.

FIG. 7 shows that the count array 122 and the pointer array 124 are indexed according to the size of the memory blocks being controlled. In the exemplary illustration of FIG. 7, a portion of the respective arrays is illustrated with a column 126 indicating sizes from one to thirty-two. In terms of an RBS page, the count array shows the number of buddy segments of each size available in the space controlled by the corresponding allocation page. In terms of an SBS page, the count array shows the number of RBS pages of each size that are available. The pointer array 124 shows the first place where an available buddy segment was last observed by any process updating the allocation page, where the pointer array is viewed in terms of an RBS page. In terms of an SBS page, the pointer array shows the first place where a free page was observed.

Thus, the count array 122 and pointer array 124 permit the data manager to determine immediately if it should look in a given allocation page for a given buddy segment size and provide a place to start looking for a segment of a particular size so the data manager does not have to start each search for an available space from the beginning of the bit map. In this way, the count array and pointer array increase the efficiency of the search for a buddy segment.

In FIG. 7, assuming an RBS page, the count array 122 data structure indicates that there is a single free block of 1 KB in size, two free blocks of 2 KB, and two free blocks of 4 KB. The pointer array 124 data structure includes a first pointer 128 that points to the free 1 KB block, a second pointer 130 that points to the first 2 KB free block, and a third pointer 132 that points to the first 4 KB free block. On some occasions, the pointer array 124 might point to a buddy segment that is available, but on other occasions the pointer array might point to a segment that was recently allocated. Hence, the pointer array actually provides a hint to the location of a free buddy segment, rather than an absolute location of an available buddy segment. Nevertheless, the pointer for a particular buddy size is guaranteed to be at least a correct starting point for a search for that size buddy segment. That is, the search will not skip past any free buddy segments of that size.

As the buddy segments (or RBS pages) are allocated, the count array 122 and the pointer array 124 are updated to indicate the current count of free blocks and point to the location of the newly allocated block, respectively. In this way, a bitmap pointer for a given size buddy segment can be said to move forward. As segments are designated to be available, the count array is updated to indicate the additional free segments and the pointer army is set to point to the segment closest to the beginning of the bitmap. In this way, a bitmap pointer can be said to move backward. Upon initialization of the data base system, all of the segment pointers of the pointer array are pointed to the first available buddy segment of each respective size. Those skilled in the art will appreciate how to implement a moving data structure pointer without further explanation.

The bit map 120 provides a representation of the allocation information concerning a particular allocation page. Each allocation page has a corresponding bit map. In the preferred embodiment, the bit map indicates whether a page is allocated or available and also indicates the size of the buddy segment. More particularly, as illustrated in FIG. 7, two bits of allocation information in the bit map are used for each disk page so that the allocation status (allocated or free) and the size of the buddy segment can be represented.

Two bits are sufficient for representing both the size and allocation status of a single page buddy segment. When a buddy segment is larger than a single page, for every page in the buddy segment there are two additional bits available for size and status information. Eight bits are sufficient for representing the allocation status and size of segments that range from one page to 32,768 (32K) pages. Therefore, when eight bits are available, that is, when a segment is at least four pages long, the general purpose representation is used. When the segment size is one or two pages, then the specific representation for one or two pages is used. It should be noted that, at most, eight bits per segment are used to hold information, while any remaining bits are left unused.

Those skilled in the art should appreciate how the discussion above concerning the FIG. 7 data structures in terms of an RBS page would relate to the data structures in terms of an SBS page. The SBS page control of RBS pages is directly analogous to the RBS control of memory location pages. The following description of the bitmap encoding is with respect to the RBS pages, but an analogous discussion would apply to the SBS pages in a manner that should be readily apparent.

Figure 8:
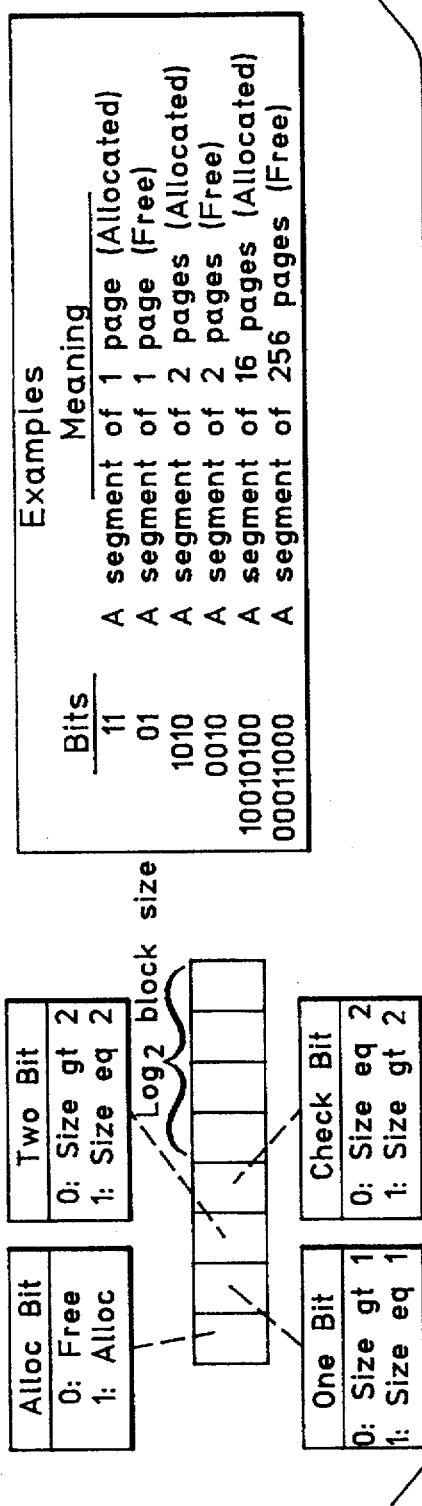
FIG. 8 is a representation of the allocation bitmap encoding scheme for the allocation page data structure illustrated in FIG. 3.

A more detailed illustration of the bit encoding used to store the size and allocation information of various sizes of buddy segments is provided in FIG. 8. The bitmap encoding illustrated in FIG. 7 should be better understood by comparison with the detailed information in the example table of FIG. 8. Thus, FIG. 8 shows that the allocated 2 KB buddy segments represented in FIG. 7 as dark bands have a corresponding bitmap encoding sequence of "1010", indicating an allocated segment of two pages. Similarly, the free 2 KB buddy segments represented in FIG. 6 as light bands have a corresponding bitmap encoding sequence of "0010", as can be seen by referring to the example table of FIG. 8 indicating a free buddy segment of two pages.

Encoding the size of the buddy segment in the page allocation bit map provides advantages when searching for a particular segment size. A first advantage is that, at most eight bits must be examined, regardless of the segment size, to determine the segment allocation status and size. Second, when a segment is freed, a simple arithmetic operation on the address of the freed segment provides the address of the buddy segment, which can then be checked immediately for possible consolidation. This is illustrated in FIG. 8, which shows how the block size in the log (base 2) can be ordered.

When the data manager searches the LOB data space for a free segment, if the segment at a current boundary is larger than the desired size, then the data manager continues the search at the end of the current segment. If the segment at the current boundary is smaller than the desired segment size, then the search continues at the next boundary of the desired segment size. For example, the path of a search for a buddy segment of size four is illustrated in FIG. 9 with respect to the bitmap 120, count array data structure 122, and pointer array data structure 124 first illustrated in FIG. 7.

Figure 9:
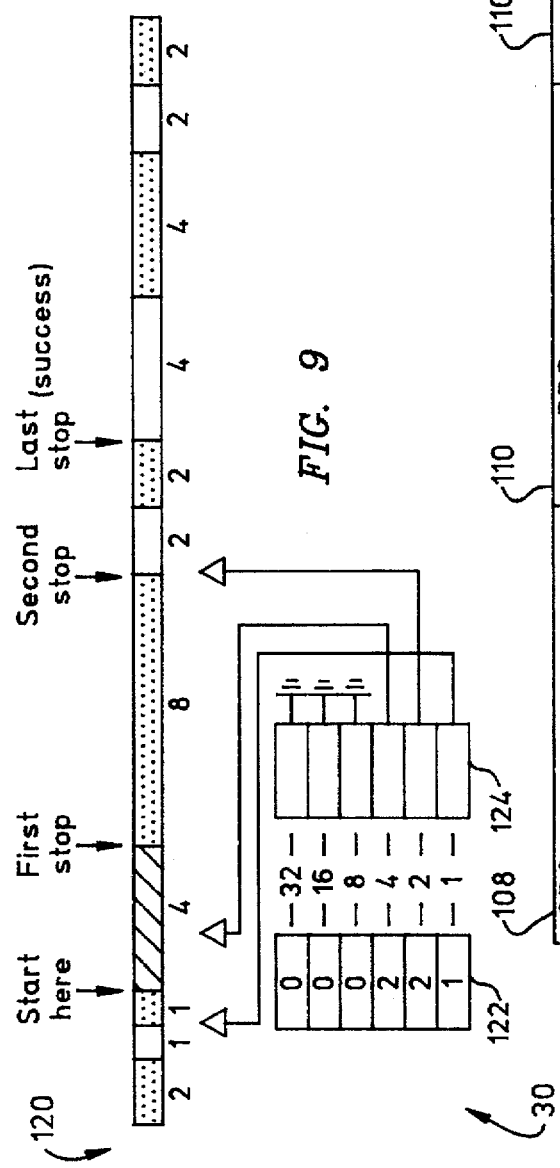
FIG. 9 is a representation of the allocation bitmap data structures illustrated in FIG. 8 during a space allocation processing.

In FIG. 9, a bitmap pointer 140 initially points (at the location marked "Start here") to the allocation bitmap 120 at a segment of size four that was recently allocated. Therefore, the data manager will begin the search for a free block there. Because that segment of size four is allocated, the data manager continues the search at the boundary of the next segment, marked "First stop", where the data manager comes upon a segment of size eight. The current segment being examined, of size eight, is larger than the desired segment, of size four, so that the data manager continues the search at the end of the current segment. At the end of the current (size eight) segment, the data manager locates a free segment of size two (marked "Second stop"). The current segment size of two is smaller than the desired segment size of four, and therefore the data manager continues its search at the next boundary of the desired segment size (size four), where the search is successful (at the point marked "Last stop"). Alternatively, if an array of single bits were used to represent the allocation information, then every search operation would require a sequential search through the bit array to determine block sizes, and every allocation operation would involve updating potentially hundreds of bits, rather than at most eight bits.

Both the RBS allocation pages 108 and the SBS allocation pages 110 illustrated in FIG. 3 contain count arrays and pointer arrays as described above in conjunction with FIGS. 5–8. In addition to the pointer array and counter array, the SBS allocation pages include a divided array data structure and an SBS page directory data structure. The divided array data structure indicates a subdivision of SBS pages. A minimum SBS unit is an RBS page, which in the illustrated embodiment controls 8 MB of storage space. SBS units are allocated in powers of two according to the binary buddy system and are marked as being either allocated or free, depending on their status. Thus, an SBS buddy segment that is two units in size (16 MB) can have a status of allocated (if it is in use) or free (if it is available). When an SBS buddy segment is one unit, however, then there is a possibility that it was further divided into smaller sizes as part of an RBS buddy segment. Therefore, the divided array data structure is used to track which SBS buddy segments have been subdivided into RBS buddy segments. The divided array contains one bit for every SBS unit. When an SBS unit bit of a divided array is turned on, it indicates that the corresponding SBS unit has been subdivided into smaller RBS sizes. The SBS unit otherwise is assumed to be a full SBS size and its status is shown by the SBS allocation bits.

The SBS page directory data structure is an array that contains one entry for each super buddy space in the LOB data space. Only one SBS page directory is needed to cover the entire LOB data space. In particular, the SBS page directory contains a flag for a predetermined number N of the largest buddy segment sizes for each SBS page. In the preferred embodiment, for example, the top sixteen sizes of buddy segments are stored. If there is at least one buddy segment of a particular size available in an SBS page, that corresponding flag is set in the SBS page directory. The flag otherwise is set to zero. In the preferred embodiment, there are seventeen sizes of buddy segments in binary size increments, ranging from the smallest size of 1 KB to the largest buddy segment size of 64 MB. The representation of the SBS page directory provides convenient use because each entry for a particular SBS page is effectively a logarithm scale. That is, one can easily determine if an SBS page contains the needed space by comparing the log (base) of the desired segment size with the SBS page directory entry. If the page directory entry is greater, than or equal to the (adjusted) log of the desired buddy segment size, then that SBS page contains at least one free buddy segment of the desired size.

As noted above, only one SBS page directory is needed for the entire LOB data space. The SBS page directory is arbitrarily kept with the first SBS page, which for convenience will be referred to as the "zero page" of the SBS pages. Because the directory contains primarily flags to indicate subdivisions, it can be kept rather compact. Thus, in the preferred embodiment, the SBS page directory occupies approximately 4 KB. For easier data structure definitions, in the preferred embodiment every SBS page includes an area in which the SBS page directory could be maintained. Because only one is needed, however, only the SBS page directory in the SBS zero page is updated and maintained. This aspect of the preferred embodiment is apparent from the representation of the RBS pages and SBS pages in FIG. 9, which will next be described.

Figure 10:
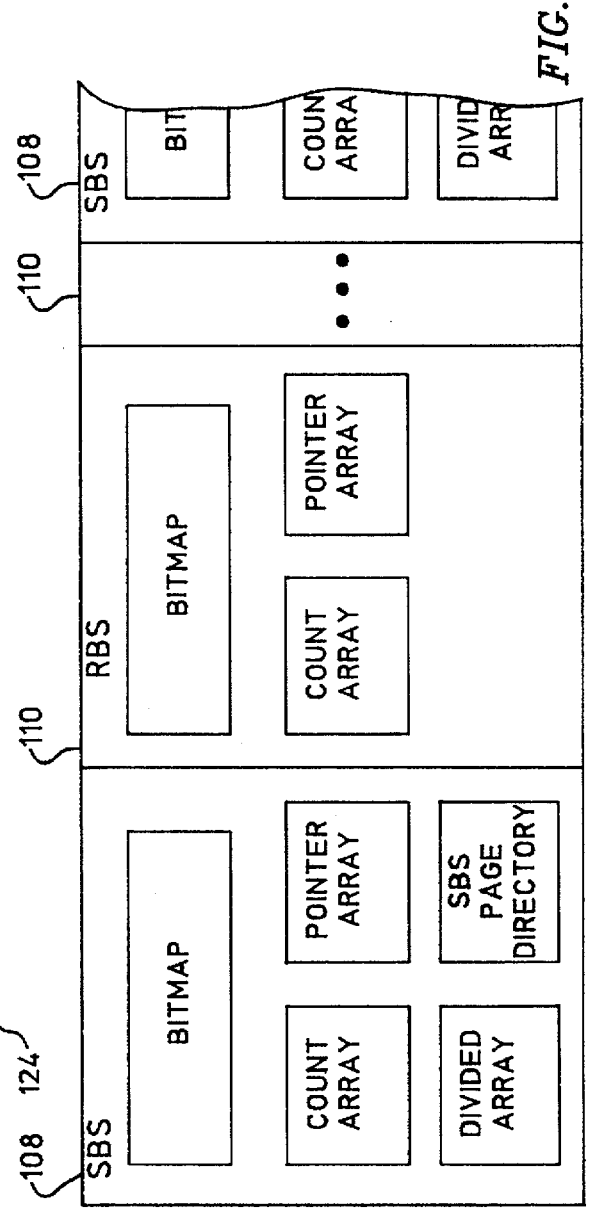
FIG. 10 is a representation of the SBS and RBS allocation pages in their relative locations in the data storage subsystem illustrated in FIG. 1.

FIG. 10 shows an arrangement of the RBS pages and SBS pages in the storage subsystem 30 (FIG. 1) according to the preferred embodiment, wherein an SBS allocation page is followed by the RBS pages that it controls. Thus, a first SBS page 140 is shown followed by a group of RBS pages 142, followed by a second SBS page 144, and so forth. Each SBS page includes a bitmap 146, count array 148, and pointer array 150, as described above, relative to the RBS pages it controls, and also includes a divided array data structure 152 and an SBS page directory 154 data structure, also as described above. It should be understood that each RIBS allocation page includes an analogous bitmap 156, count array 158, and pointer array 160, as described above, relative to the data storage pages that it controls.

Figure 11:
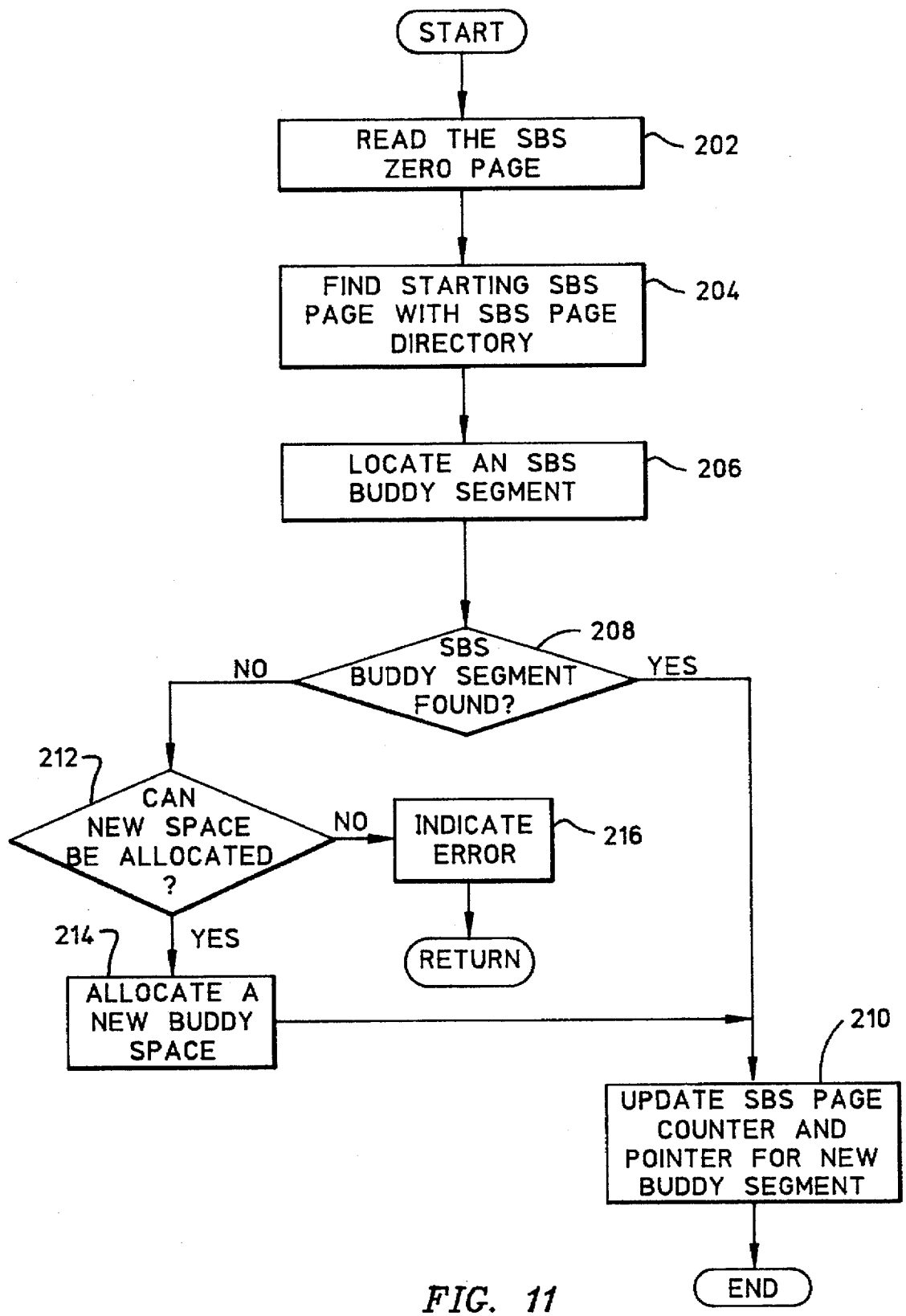
FIG. 11 a flow diagram that illustrates the processing steps performed by the data manager illustrated in FIG. 2 in searching the SBS data structures.

The operation of the data manager in searching the SBS pages and updating the allocation information when allocating blocks will be better understood with reference to the flow diagram of FIG. 11. In the first step, represented by the flow diagram box numbered 202, the data manager reads the SBS zero page. In the next step, corresponding to the flow diagram box numbered 204, the data manager finds the appropriate starting SBS page using the SBS page directory data structure, as described above. Next, the data manager uses a conventional linear page search to locate an SBS buddy segment of the appropriate size, as represented by the flow diagram box numbered 206. At the decision box numbered 208, the data manager determines if a buddy segment was found in the located space. If a space was found, then the data manager proceeds to use the segment for a store operation and, as represented by the flow diagram box numbered 210, updates the SBS page counter and pointer data structures to refer to the new buddy segment. If no SBS buddy segment was found at box 208, then the data manager proceeds to the flow diagram box numbered 212, where it determines if a new space can be allocated. If a new space cannot be allocated, such as when no suitable space is free, the data manager returns an error indication at the flow diagram box numbered 216. If a new space can be allocated, an affirmative outcome at the decision box 212, then the data manager allocates a new buddy space at the flow diagram box numbered 214. The data manager then concludes its operation by updating the SBS page counter and pointer array for the newly allocated buddy segment, as represented by the flow diagram box numbered 210.

The processing steps carried out by the data manager in allocating the SBS buddy pages as illustrated in FIG. 11 will be better understood with reference to the following pseudocode:

```
SBS Buddy Segment Allocate:
Read the SBS zero page;
Use the SBS page directory to find the
    appropriate starting SBS page;
Use the standard page search to locate
    an SBS buddy segment;
    If no SBS buddy segment found in the
        existing space, then:
        Allocate new space;
        else
        If no new space, then:
            Indicate error;
        endif;
    endif;
Update the SBS page counter and
    pointer array for the new buddy
    segment.
```

The processing exemplified by the pseudo code should be apparent to close skilled in the art, in view of the flow diagram and discussion above, without further explanation.

Figure 12:
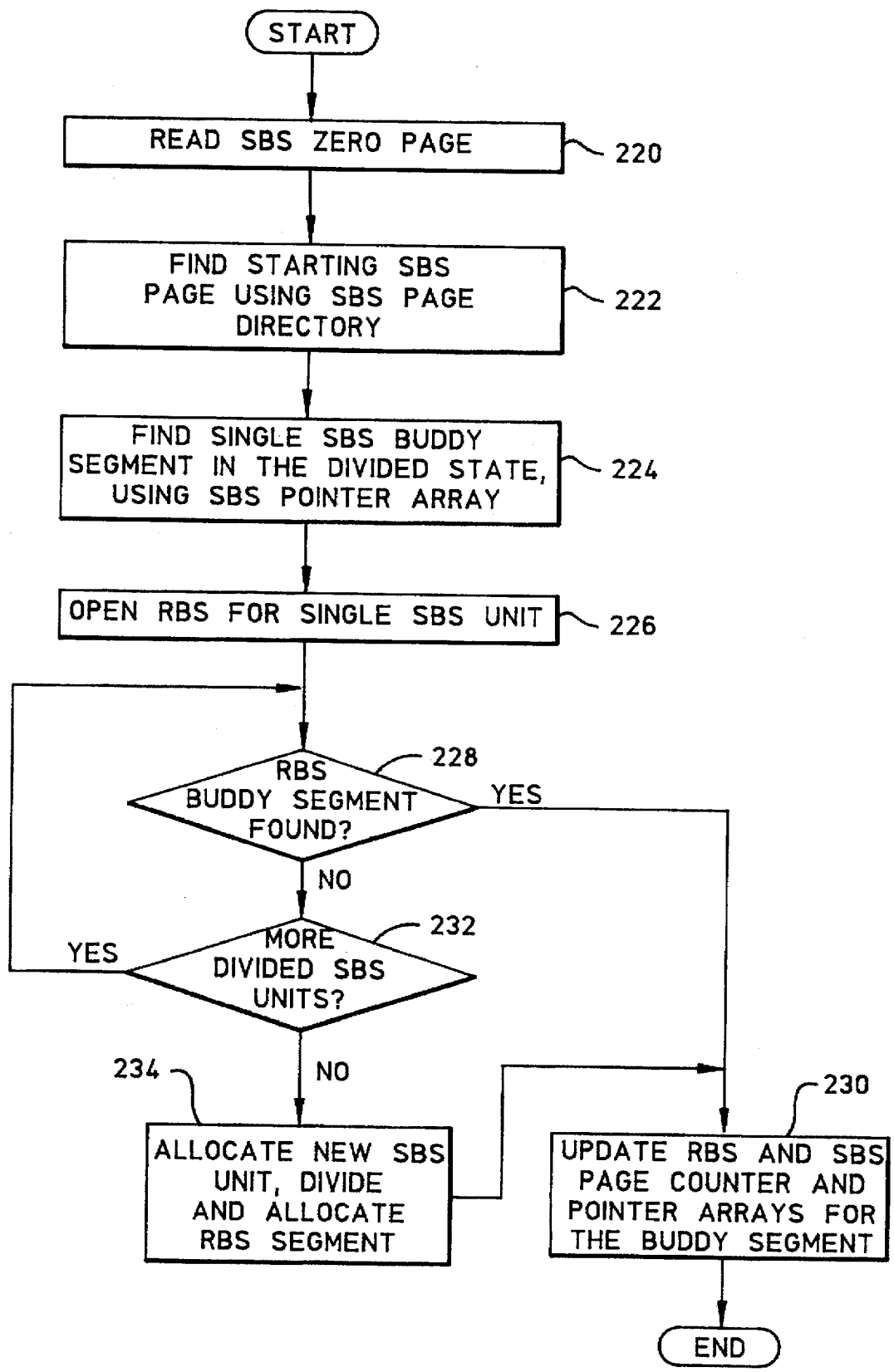
FIG. 12 a flow diagram that illustrates the processing steps performed by the data manager illustrated in FIG. 2 in searching the RBS buddy segment data structures during a space allocation.

The flow diagram of FIG. 12 represents the processing steps followed by the data manager in allocating an RBS buddy segment. In the first step, the data manager reads the SBS zero page, represented by the flow diagram box numbered 220. In the second step, the data manager uses the SBS page directory data structure to find the appropriate starting SBS page, as represented by the flow diagram box numbered 222. The flow diagram box numbered 224 indicates that the data manager next searches the SBS pages for single buddy segments that are in the divided state, using the SBS pointer array data structure to locate a segment of the appropriate size. As before, conventional linear search techniques can be used.

The next processing step, represented by the FIG. 12 flow diagram box numbered 226, is the beginning of a processing loop for locating a proper-sized RBS buddy segment that can be allocated. Thus, at the box numbered 226, the data manager begins by opening the RBS page that corresponds to the single SBS unit located previously. Those skilled in the art will appreciate that "opening" a page refers to orienting a pointer to a specific area of storage locations in the data storage subsystem. When the data manager opens a page, it can determine the status of the page (allocated or free). At the next processing step after opening, represented by the decision box numbered 228, the data manager uses a conventional linear page search and attempts to locate an available RBS buddy segment. If an RBS buddy segment is located, an affirmative response at the box numbered 228, then the data manager updates both the RBS and SBS counter array and pointer array data structures for the RBS buddy segment, as represented by the flow diagram box numbered 230. Thus ends the allocation processing. If no RBS buddy segment is located at the decision box numbered 228, then at the decision box numbered 232, the data manager determines if additional divided SBS units remain to be opened and checked for free status. If there are additional divided SBS units, an affirmative response, then processing returns to the flow diagram box numbered 226 where the next RBS page is opened. If there is a negative response at the decision box numbered 232, meaning that there are no additional divided SBS units, then the data manager has completed its loop through the SBS units without finding an available RBS buddy segment.

Because the loop was completed without locating an available RBS buddy segment, the data manager next allocates a new SBS unit and also divides and allocates an RBS buddy segment. This step is represented in FIG. 12 by the flow diagram box numbered 234. After the allocation, the data manager completes the allocation processing by updating the RBS and SBS page counter and pointer array data structures for the newly allocated RBS buddy segment, as represented by the flow diagram box numbered 230.

The processing steps carded out by the data manager in allocating the RBS buddy pages as illustrated in FIG. 12 will be better understood with reference to the following pseudocode:

```
RBS Buddy Segment Allocate:
Read the SBS zero page;
Use the SBS page directory to find the
    appropriate starting SBS page;
Search the SBS page for single SBS
    buddy segments that are in the
    divided state, using the SBS pointer
    array;
    Loop until no more divided SBS units:
        Open the RBS that corresponds to
            the single SBS unit;
        Use the standard page search to
            locate an RBS buddy segment;
        If RBS buddy segment found then:
            Update the RBS and the SBS
```

```
        page counter and pointer
            arrays for the buddy segment;
        Exit Loop;
      endif;
    endloop;
    If no divided buddy segments are found
      then:
        Allocate new SBS unit, divide and
            allocate RBS buddy segment;
    endif;
    If no error, then:
        Update both the RBS and SBS
            counter and pointer arrays;
    endif.
```

The processing exemplified by the pseudo code should be apparent to those skilled in the art, in view of the flow diagram and discussion above, without further explanation.

Figure 13:
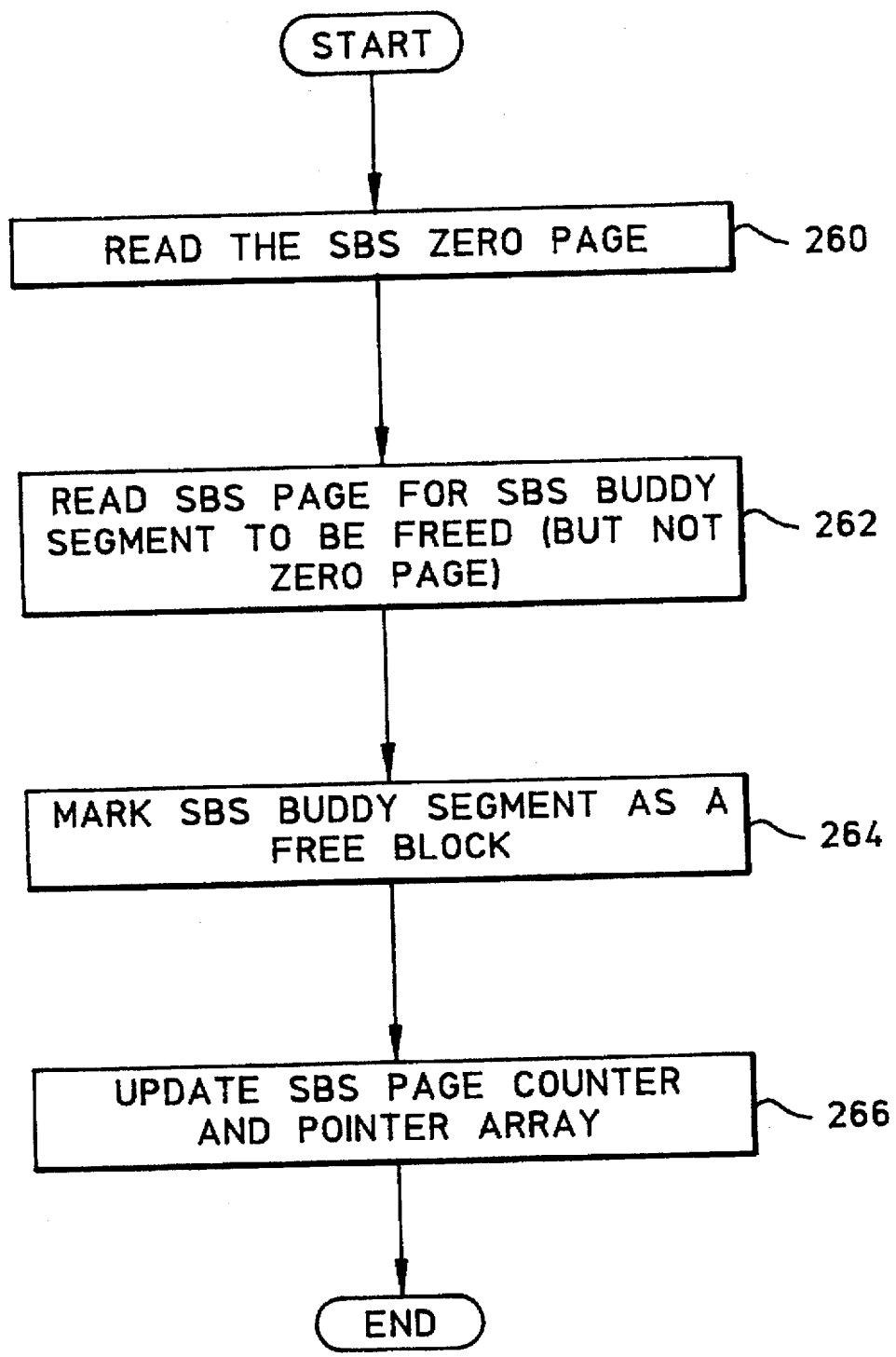
FIG. 13 is a flow diagram that illustrates the processing steps performed by the data manager illustrated in FIG. 2 in freeing an SBS buddy segment.

FIG. 13 is a flow diagram that represents the processing steps followed by the data manager in freeing an SBS buddy segment. In the first processing step, represented by the flow diagram box numbered 260, the data manager reads the SBS zero page. In the next processing step, the data manager reads the SBS page corresponding to the SBS buddy segment to be freed (flow diagram box numbered 262). It should be apparent that the SBS page read by the data manager will be a page other than the zero page, which was already read in the previous processing step. The next step, represented by the flow diagram box numbered 264, is for the data manager to mark the SBS buddy segment as having a free status. Finally, in the flow diagram box numbered 266, the data manager updates the SBS page counter and pointer array data structures.

The processing steps carried out by the data manager in designating SBS buddy segments to be free of data will be better understood with reference to the following pseudocode:

```
SBS Buddy Segment Free:
  Read the SBS zero page;
  Read the SBS page corresponding to the
      SBS buddy segment to be freed (not
      needed if SBS page zero);
  Mark the SBS buddy segment to indicate
      it is a free block;
  Update the SBS page counter and
      pointer array.
```

The processing exemplified by the pseudo code should be apparent to those skilled in the art, in view of the flow diagram and discussion above, without further explanation.

Figure 14:
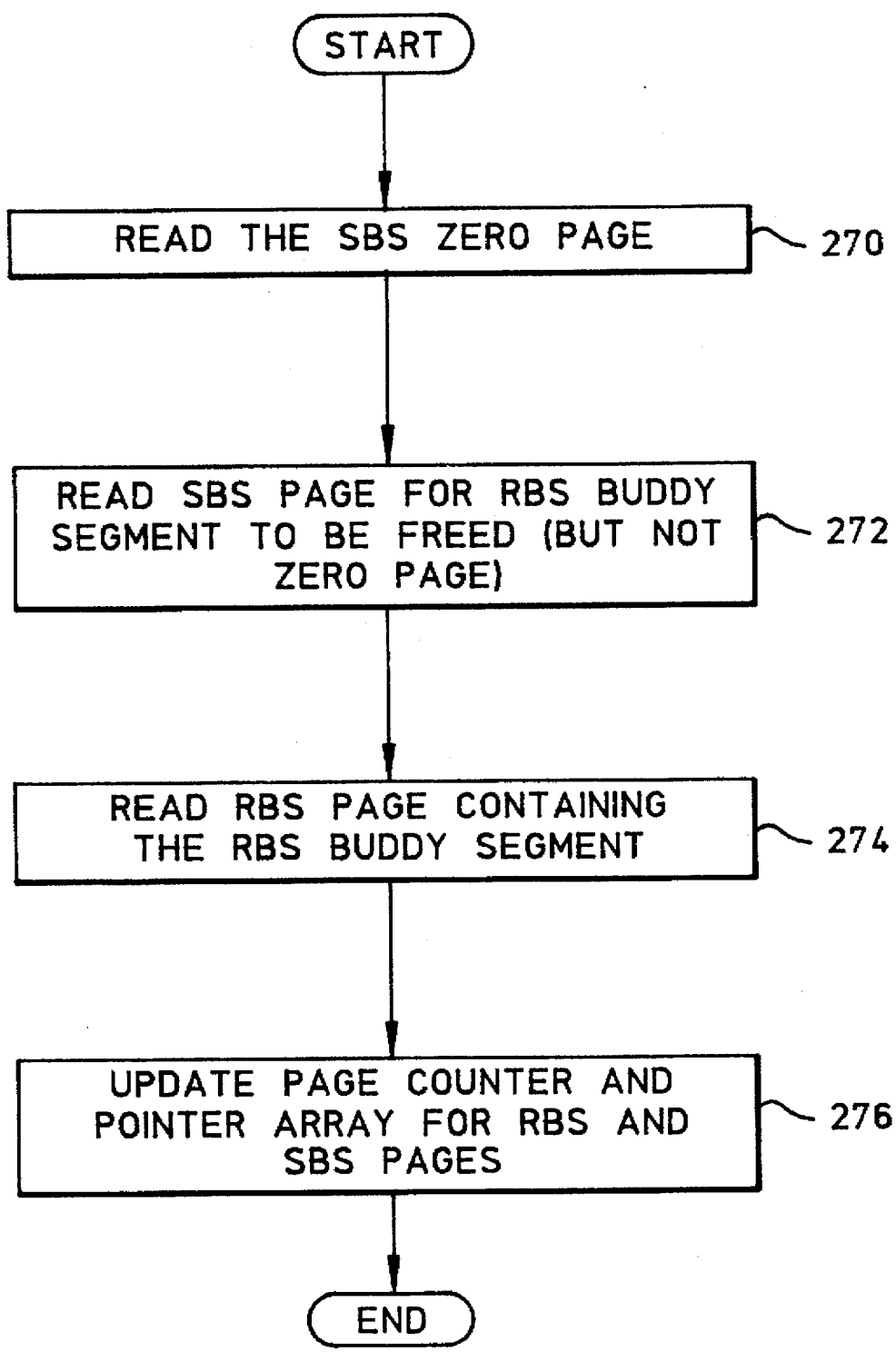
FIG. 14 is a flow diagram that illustrates the processing steps performed by the data manager illustrated in FIG. 2 is freeing an RBS buddy segment.

The processing of the data manager in freeing an RBS buddy segment will be better understood with reference to the flow diagram box of FIG. 14. In the first processing step, represented by the flow diagram box numbered 270, the data manager reads the SBS zero page. In the next step, represented by the flow diagram box numbered 272, the data manager reads the SBS page corresponding to the RBS buddy segment to be freed. As with the SBS page processing of FIG. 13, it should be apparent that the SBS page read by the data manager during the processing of FIG. 14 will be a page other than the zero page, which was already read in the previous processing step. Next, the data manager reads the RBS page containing the RBS buddy segment identified previously (flow diagram box numbered 274). Finally, at the flow diagram box numbered 276, the data manager updates the pointer and counter arrays on both the RBS and SBS pages.

The processing steps carried out by the data manager in designating RBS buddy segments to be free of data will be better understood with reference to the following pseudocode:

```
RBS Buddy Segment Free:
  Read the SBS zero page;
  Read the SBS page corresponding to the
      RBS buddy segment to be freed (not
      needed if SBS page zero);
  Read the RBS page containing the RBS
      buddy segment;
  Update the page counters and pointer
      arrays on the RBS and SBS pages.
```

The processing exemplified by the pseudo code should be apparent to those skilled in the art, in view of the flow diagram and discussion above, without further explanation.

The data manager described above in connection with a presently preferred embodiment of the invention uses a two-tiered allocation page configuration to manage a data space of up to four terabytes. It should be apparent that the principles of this invention could be used with even greater multiple-tiered configurations to manage still larger data spaces of extremely large size containing LOBs of similarly large size.

The preferred embodiment of the invention has been primarily disclosed as a computer system and method of operation thereof. In particular, it will be understood by persons of ordinary skill in the art that the computer system described above includes appropriate components (including program storage, input/output facilities, a connecting bus, and the like) and that the computer system could be programmed or otherwise designed to facilitate the practice of the method of the invention. Such a computer system would include appropriate program means for executing the method of the invention. Also, an article of manufacture, such as a pre-recorded floppy disk or other similar computer program product for use with such computer systems, could include a storage medium and program means recorded thereon (readable by an appropriate component of the computer system) for directing the computer system to facilitate the practice of the method of the invention. It will be understood that such apparatus and articles of manufacture also fall within the spirit and scope of the invention.

The present invention has been described above in terms of a presently preferred embodiment so that an understanding of the present invention can be conveyed. There are, however, many configurations for relational data base management systems not specifically described herein but with which the present invention is applicable. The present invention should therefore not be seen as limited to the particular embodiment described herein, but rather, it should be understood that the present invention has wide applicability with respect to space management systems generally. All modifications, variations, or equivalent arrangements that are within the scope of the attached claims should therefore be considered to be within the scope of the invention.

I claim:

1. A space management system for use in managing storage allocation for the storage of data values of a data type corresponding to large data objects (LOBs) stored in storage locations of a data base of a computer system having a central processor, a memory unit, and a storage subsystem containing a LOB data space in which the LOB data values are stored, the space management system comprising:

a plurality of regular-tier allocation page data structures that indicate, for a predetermined number of LOB data space storage locations comprising a regular-tier buddy space, whether the storage locations are free or allocated such that each regular-tier allocation page identifies free regular-tier buddy spaces of the LOB data space in which to store the LOB data value and thereby control data access to the regular-tier buddy spaces;

a plurality of super-tier allocation page data structures of the LOB data space that indicate, for a predetermined number of regular-tier pages comprising a super-tier buddy space, whether the regular-tier pages are free or allocated, to identify one or more free super-tier buddy spaces in which to store the LOB data value, where the LOB data value has a size such that it cannot be stored in less than one super-tier buddy space, and thereby control data access to the super-tier buddy spaces, such that at least one super-tier allocation page identifies free super-tier buddy spaces over the entire LOB data space; and a data manager controller that receives requests from users of the computer system for access to LOB data values and that allocates storage locations in the LOB data space identified by the super-tier allocation pages and regular-tier allocation pages, respectively, as free for the storage of LOB data values and frees selected LOB data space storage locations that are no longer needed for the storage of LOB data values; wherein:

each regular-tier allocation page controls a predetermined number of LOB data space storage locations comprising a storage page of the relational data base;

the data manager controller allocates blocks of storage pages according to an increasing binary sequence of block sizes;

each regular-tier allocation page includes:

a pointer array data structure that points to a free block of each regular-tier allocation page size; and a count array data structure that identifies the number of storage location blocks that are allocated for storing data for each size of the binary sequence;

the data manager controller allocates blocks of LOB data space storage pages in units of regular-tier buddy space storage pages according to an increasing binary sequence of regular-tier allocation page block sizes;

each super-tier allocation page includes:

a pointer array data structure that points to a free regular-tier allocation page; and a count array data structure that identifies, for each size of regular-tier allocation page block in the binary sequence, the number of regular-tier allocation pages that are free; and a first super-tier allocation page indicates a starting point for searching for a free regular-tier allocation page;

further including a divided page array data structure in which the data manager controller indicates, for each super-tier allocation page, whether that page controls super-tier buddy spaces that have been subdivided so as to include allocated blocks of regular-tier buddy spaces smaller than one super-tier buddy space in size;

wherein only one super-tier allocation page identifies free super-tier buddy spaces over the entire LOB data space, comprising a super-tier buddy space page directory, and both the divided page array and super-tier buddy space page directory are stored in one super-tier allocation page.

2. A method of managing storage allocation for storage of data values in a data base wherein system users request access to data values of a data type corresponding to large data objects (LOBs) stored in storage locations of a LOB data space of a data base of a computer system having a central processor, a memory unit, and a storage subsystem containing the LOB data space so as to allocate free storage locations of the LOB data space for the storage of new LOB data values and to free selected storage locations that are no longer needed for the storage of past LOB data values, the method comprising the steps of:

receiving a user request for access to the LOB data space for storage of a LOB data value having a size comprising a predetermined number of storage locations necessary for storage of the LOB data value in the LOB data space;

examining a super-tier allocation page data structure of the LOB data space that indicates, for a higher-tier block of LOB data space storage locations comprising a predetermined number of storage locations, whether super-tier blocks over the entire LOB data space are free or allocated, to identify one or more free super-tier blocks in which to store the LOB data value where the LOB data value has a size such that it cannot be stored in less than one super-tier block;

allocating the free block of storage locations identified in the step of examining, for storage of the LOB data value where the LOB data value has a size such that it cannot be stored in less than one super-tier block;

examining a regular-tier allocation page data structure of the LOB data space that indicates, for a regular-tier of LOB data space storage locations comprising a predetermined number of storage locations, whether regular-tier blocks over a predetermined number of storage locations equal to a smallest super-tier block, are free or allocated, to identify one or more free regular-tier blocks in which to store the LOB data value;

allocating the identified free regular-tier blocks for storage of the LOB data value if it was not allocated previously; and updating data structures of the super-tier allocation pages and regular-tier allocation pages to indicate the identified storage locations as being allocated; wherein:

the step of allocating identified regular-tier blocks of storage comprises allocating blocks of storage pages according to an increasing binary sequence of block sizes;

the step of allocating regular-tier blocks comprises allocating storage pages in 1 kilobyte blocks of LOB data space storage locations and the binary sequence of regular-tier page block sizes includes a smallest block comprising a single storage page;

the step of updating data structures includes:

updating a pointer array data structure of each regular-tier allocation page that points to a free block of each regular-tier allocation page size; and updating a count array data structure that identifies the number of storage location blocks that are allocated for storing data for each size of the binary sequence;

the step of allocating free super-tier blocks comprises allocating blocks of LOB data space storage pages in units of regular-tier buddy space storage pages according to an increasing binary sequence of regular-tier allocation page block sizes;

the step of updating includes:

updating a pointer array data structure of each super-tier allocation page that points to a free regular-tier allocation page of each super-tier allocation page size; and updating a count array data structure of each super-tier allocation page that identifies, for each size of super-tier allocation page in the binary sequence, the number of super-tier allocation pages that are free; and the step of updating further includes:

updating a divided page array data structure that indicates, for each super-tier allocation page, whether that page controls super-tier buddy spaces that have been subdivided so as to include allocated blocks of regular-tier buddy spaces smaller than one super-tier buddy space in size.

3. A computer system comprising:

a central processor unit;

a memory unit;

at least one storage device for the storage of data values of a data type corresponding to large data objects (LOBs), the storage device containing a LOB data space having LOB data values of a data base;

a data base management system that permits a computer system user to generate requests for access to LOBs of a data base, the data base management system including:

a plurality of regular-tier allocation page data structures that indicate, for a predetermined number of LOB data space storage locations comprising a regular-tier buddy space, whether the storage locations are free or allocated such that each regular-tier allocation page identifies free regular-tier buddy spaces of the LOB data space in which to store the LOB data value and thereby control data access to the regular-tier buddy spaces;

a plurality of super-tier allocation page data structures of the LOB data space that indicate, for a predetermined number of regular-tier pages comprising a super-tier buddy space, whether the regular-tier pages are free or allocated, to identify one or more free super-tier buddy spaces in which to store the LOB data value, where the LOB data value has a size such that it cannot be stored in less than one super-tier buddy space, and thereby control data access to the super-tier buddy spaces, such that at least one super-tier allocation page identifies free super-tier buddy spaces over the entire LOB data space; and a data manager controller that receives requests from users of the computer system for access to LOB data values and that allocates storage locations in the LOB data space identified by the super-tier allocation pages and regular-tier allocation pages, respectively, as free for the storage of LOB data values and frees selected LOB data space storage locations that are no longer needed for the storage of LOB data values; wherein:

each regular-tier allocation page controls a predetermined number of LOB data space storage locations comprising a storage page of the data base;

each regular-tier allocation page includes:

a pointer array data structure that points to a free block of each regular-tier allocation page size; and a count array data structure that identifies the number of storage location blocks that are allocated for storing data for each size of the binary sequence;

the data manager controller allocates blocks of LOB data space storage pages in units of regular-tier buddy space storage pages according to an increasing binary sequence of regular-tier allocation page block sizes;

each super-tier allocation page includes:

a pointer array data structure that points to a free regular-tier allocation page; and a count array data structure that identifies, for each size of regular-tier allocation page block in the binary sequence, the number of regular-tier allocation pages that are free;

a first super-tier allocation page indicates a starting point for searching for a free regular-tier allocation page;

further including a divided page array data structure in which the data manager controller indicates, for each super-tier allocation page, whether that page controls super-tier buddy spaces that have been subdivided so as to include allocated blocks of regular-tier buddy spaces smaller than one super-tier buddy space in size;

wherein only one super-tier allocation page identifies free super-tier buddy spaces over the entire LOB data space, comprising a super-tier buddy space page directory, and both the divided page array and super-tier buddy space page directory are stored in one super-tier allocation page.

4. A program storage device readable by a processor machine, tangibly embodying a program of instructions executable by the processor machine to perform method steps for managing storage allocation for storage of data values in a relational data base wherein system users request access to data values of a data type corresponding to large data objects (LOBs) stored in storage locations of a LOB data space of a relational data base of a computer system having a central processor, a memory unit, and a storage subsystem containing the LOB data space so as to allocate free storage locations of the LOB data space for the storage of new LOB data values and to free selected storage locations that are no longer needed for the storage of past LOB data values, the method steps performed by the processor machine comprising the steps of:

receiving a user request for access to the LOB data space for storage of a LOB data value having a size comprising a predetermined number of storage locations necessary for storage of the LOB data value in the LOB data space;

examining a super-tier allocation page data structure of the LOB data space that indicates, for a higher-tier block of LOB data space storage locations comprising a predetermined number of storage locations, whether super-tier blocks over the entire LOB data space are free or allocated, to identify one or more free super-tier blocks in which to store the LOB data value where the LOB data value has a size such that it cannot be stored in less than one super-tier block;

allocating the free block of storage locations identified in the step of examining, for storage of the LOB data value where the LOB data value has a size such that it cannot be stored in less than one super-tier block;

examining a regular-tier allocation page data structure of the LOB data space that indicates, for a regular-tier of LOB data space storage locations comprising a predetermined number of storage locations, whether regular-tier blocks over a predetermined number of storage locations equal to a smallest super-tier block, are free or allocated, to identify one or more free regular-tier blocks in which to store the LOB data value;

allocating the identified free regular-tier blocks for storage of the LOB data value if it was not allocated previously; and updating data structures of the super-tier allocation pages and regular-tier allocation pages to indicate the identified storage locations as being allocated; wherein:

the step of allocating identified regular-tier blocks of storage comprises allocating blocks of storage pages according to an increasing binary sequence of block sizes;

the step of allocating regular-tier blocks comprises allocating storage pages in 1 kilobyte blocks of LOB data space storage locations mad the binary sequence of regular-tier page block sizes includes a smallest block comprising a single storage page;

the step of updating data structures includes:

updating a pointer array data structure of each regular-tier allocation page that points to a free block of each regular-tier allocation page size; and updating a count array data structure that identifies the number of storage location blocks that are allocated for storing data for each size of the binary sequence;

the step of allocating free super-tier blocks comprises allocating blocks of LOB data space storage pages in units of regular-tier buddy space storage pages according to an increasing binary sequence of regular-tier allocation page block sizes;

the step of updating includes:

updating a pointer array data structure of each super-tier allocation page that points to a free regular-tier allocation page of each super-tier allocation page size; and updating a count array data structure of each super-tier allocation page that identifies, for each size of super-tier allocation page in the binary sequence, the number of super-tier allocation pages that are free; and the step of updating further includes:

updating a divided page array data structure that indicates, for each super-tier allocation page, whether that page controls super-tier buddy spaces that have been subdivided so as to include allocated blocks of regular-tier buddy spaces smaller than one super-tier buddy space in size.

* * * * *